United States Patent
Lopez et al.

(10) Patent No.: US 8,760,993 B2
(45) Date of Patent: Jun. 24, 2014

(54) METHOD OF POWER CONTROL

(75) Inventors: Miguel Lopez, Solna (SE); Tomas Andersson, Vasteras (SE); Benny Lennartson, Hagersten (SE)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 305 days.

(21) Appl. No.: 12/864,753

(22) PCT Filed: Oct. 29, 2008

(86) PCT No.: PCT/SE2008/051221
§ 371 (c)(1),
(2), (4) Date: Jul. 27, 2010

(87) PCT Pub. No.: WO2009/096840
PCT Pub. Date: Aug. 6, 2009

(65) Prior Publication Data
US 2010/0302990 A1 Dec. 2, 2010

Related U.S. Application Data

(60) Provisional application No. 61/024,685, filed on Jan. 30, 2008.

(30) Foreign Application Priority Data

Jan. 30, 2008 (SE) .................. PCT/SE2008/050116

(51) Int. Cl.
H04J 11/00 (2006.01)
(52) U.S. Cl.
USPC .......................... 370/207; 375/308

(58) Field of Classification Search
USPC ........ 370/203–208, 312, 252, 329, 432, 465, 370/478–480; 375/216, 219, 260, 302–308
See application file for complete search history.

(56) References Cited

U.S. PATENT DOCUMENTS 4,736,170 A * 4/1988 Wu et al. .................. 375/308
5,469,112 A 11/1995 Lee
(Continued)

FOREIGN PATENT DOCUMENTS

CN 1473402 A 2/2004
CN 1533071 A 9/2004
(Continued)

OTHER PUBLICATIONS

3rd Generation Partnership Project. "Voice Capacity Evolution with Orthogonal Sub Channel." 3GPP TSG GERAN #33, Tdoc GP-070214, Seoul, South Korea, Agenda Item 6.1, 7.1.5.6, Feb. 12-16, 2007.

(Continued)

*Primary Examiner* — Jeffrey M Rutkowski
(74) *Attorney, Agent, or Firm* — Coats & Bennett, P.L.L.C.

(57) ABSTRACT

In a method and a transmitter data is transmitted to two mobile stations sharing the same frequency band and the same timeslot. The data is modulated using a quaternary symbol constellation. Further, the data is transmitted to two mobile stations multiplexed on a shared channel comprising two branches and the transmission power for the transmitted data is set in response to the relative gain of the two branches. Hereby, the total system interference is reduced. The method and transmitter further allows for a cellular radio system individual power control loops for the two sub-channels when the system uses MUROS.

20 Claims, 9 Drawing Sheets

(56) References Cited

U.S. PATENT DOCUMENTS

| | | |
|---|---|---|
| 6,185,259 B1 | 2/2001 | Dent |
| 6,385,233 B1* | 5/2002 | Berger ............ 375/216 |
| 6,421,398 B1 | 7/2002 | McVey |
| 6,654,405 B1 | 11/2003 | McDonough |
| 6,865,235 B2* | 3/2005 | Khoini-Poorfard ......... 375/308 |
| 7,944,884 B2* | 5/2011 | Chitrapu et al. ............ 370/208 |
| 8,149,727 B2* | 4/2012 | Futagi et al. ................ 370/252 |
| 2002/0037059 A1 | 3/2002 | Heegard et al. |
| 2002/0110154 A1 | 8/2002 | Odenwalder |
| 2002/0131478 A1* | 9/2002 | Somayazulu et al. ....... 375/308 |
| 2002/0168026 A1* | 11/2002 | Khoini-Poorfard ......... 375/308 |
| 2003/0099306 A1 | 5/2003 | Nilsson et al. |
| 2004/0013172 A1 | 1/2004 | Hashiguchi et al. |
| 2004/0114551 A1 | 6/2004 | Gavillero Martin et al. |
| 2004/0184560 A1* | 9/2004 | Shen et al. ................... 375/308 |
| 2005/0002471 A1* | 1/2005 | Tramm et al. ............... 375/308 |
| 2005/0084044 A1 | 4/2005 | Kokkonen |
| 2005/0152473 A1 | 7/2005 | Maltsev et al. |
| 2005/0254600 A1 | 11/2005 | Chen et al. |
| 2007/0070968 A1 | 3/2007 | Kawasaki |
| 2007/0195907 A1 | 8/2007 | Wang et al. |
| 2007/0268977 A1 | 11/2007 | Wang et al. |
| 2008/0159246 A1 | 7/2008 | Niemela |
| 2008/0240151 A1* | 10/2008 | Chitrapu et al. ............. 370/465 |
| 2009/0141782 A1* | 6/2009 | Chitrapu et al. ............. 375/219 |
| 2010/0157833 A1 | 6/2010 | Vrcelj et al. |
| 2010/0208716 A1 | 8/2010 | Mujtaba et al. |

FOREIGN PATENT DOCUMENTS

| | | |
|---|---|---|
| CN | 101005303 A | 7/2007 |
| EP | 1037437 A2 | 9/2000 |
| EP | 2238724 A0 | 10/2010 |
| JP | 2007096740 A | 4/2007 |
| WO | 2007037412 A1 | 4/2007 |
| WO | 2009096832 A1 | 8/2009 |

OTHER PUBLICATIONS

Nokia Siemens Networks, et al., "Voice Capacity Evolution with Orthogonal Sub Channels", 3GPP TSG GERAN #36, Tdoc GP-071792, Agenda Item 6.1, 7.1.5.18, pp. 1-12, Nov. 12-19, 2007, Vancouver, Canada.

3GPP, "Multi-User Reusing-One-Slot (MUROS)", 3GPP TSG GERAN #36, GP-072027, Agenda Item 6.1,7.1.5.18, pp. 1-3, Nov. 12-16, 2007, Vancouver, Canada.

Khairy, M. M., "Asymmetric Modulation and Multistage Coding for Multicasting with Multi-Level Reception over Fading Channels", Conference publication, IEEE Military Communications Conference Proceedings, Atlantic City, NJ, Oct. 31, 1999, pp. 92-96, vol. 1, IEEE, US.

Hill, D. A., "Carrier Detection of Unbalanced QPSK Direct Sequence Signals", IEEE Military Communications Conference Proceedings, Atlantic City, NJ, Oct. 31, 1999, pp. 437-441, vol. 1, IEEE, US.

Nokia, "Voice Capacity Evolution with Orthogonal Sub Channel", 3GPP TSG GERAN #33, Seoul, South Korea, Feb. 12, 2007, pp. 1-8, Tdoc GP-070214, Agenda item 6.1, 7.1.5.6, 3rd Generation Partnership Project.

Search Report for Application No. CN 2008-801258920 issued on Aug. 20, 2012, pp. 1-2.

* cited by examiner

Output power = $P_A$

α=0.6 => β=+2dB, γ=-4dB
Output power = $P_B = P_A - 2dB$

METHOD OF POWER CONTROL

TECHNICAL FIELD

The present invention relates to a method and a device for controlling power in a cellular radio system.

BACKGROUND

The concept of Orthogonal Sub Channels (OSC) proposed in "Voice capacity evolution with orthogonal sub channel, see" 3GPP TSG GERAN Meeting #33, GP-070214 has been well accepted. One reason is that the dramatic growth of the subscriber base in developing countries imposes a tremendous pressure on the Base Transceiver Station (BTS) hardware resources. Therefore, a study item for a technique dubbed MUROS (Multiple User Reusing One Slot) has been opened in the standardization of GSM, see "New Study Item on Multi-User Reusing One Slot (MUROS" 3GPP TSG GERAN Meeting #36, GP072027).

OSC is a multiplexing technique that allows two users to share the same frequency and time slot. It relies on Quadrature Phase Shift Keying (QPSK) modulation in the downlink channel. The I and Q branches of a modulated signal form two sub channels. The data carried by the I branch belongs to a first user, while the data carried by the Q branch belongs to a second user. Orthogonality is preserved by using a root raised cosine pulse shaping filter with a bandwidth equal to the reciprocal of the symbol period, although other transmit pulses may also be employed. At the receiver side, the mobile stations (MS) rely on orthogonal training sequences in order to separate the sub channels, see 3GPP TSG GERAN Meeting #33, GP-070214. In the uplink channel, the two mobile stations sharing the same channel also transmit in the same frequency and time slot. The base station separates the two users using a multi-user detector, e.g. successive interference cancellation.

It has been stated in "New Study Item on Multi-User Reusing One Slot (MUROS" 3GPP TSG GERAN Meeting #36, GP072027, that the physical layer for MUROS must support legacy mobile stations in one of the sub channels. However, it has been reported, see e.g. "The Performance of OSC and Feasibility Analysis", 3GPP TSG GERAN Meeting #36, GP071663 and "Discussion Paper on OSC", 3GPP TSG GERAN Meeting #36, GP071785, that OSC may not be backward compatible with legacy Gaussian minimum shift keying (GMSK) mobile stations. A problem arises in the downlink channel, because a legacy receiver exhibits very poor performance when the transmitted signal is Quadrature phase-shift keying (QPSK) modulated.

Moreover, some concerns have been raised about the constraints that OSC imposes on power control and the need to subdivide the cells of a cellular radio system, leading to additional handovers and hence presenting a potential to degrade some of the Key Performance Indicators (KPI) such as dropped calls, see also "On Orthogonal Sub channels", 3GPP TSG GERAN Meeting #36, GP071720. Also so far, none of the proposals for MUROS as set out in Voice capacity evolution with orthogonal sub channel," 3GPP TSG GERAN Meeting #33, GP-070214 and "Speech capacity enhancements using DARP", 3GPP TSG GERAN Meeting #36, GP071739 fulfills the backward compatibility requirement for legacy mobiles.

Hence, there exist a need for a method and a system that eliminates or at least reduces the negative aspects of introducing OSC in existing cellular radio systems. Also, there exists a need for an improved power control method for MUROS.

SUMMARY

It is an object of the present invention to overcome or at least reduce some of the problems associated with existing transmission techniques for MUROS.

This object and others are obtained by a method and a transmitter as set out in the appended claims. Hence, in accordance with the present invention data is transmitted to two mobile stations in the same slot. The data is modulated using a variation of quadrature phase shift keying, QPSK, modulation. The variation consists of allowing rectangular symbol constellations in addition to a traditional square constellation associated with QPSK. Further, the data is transmitted to two mobile stations multiplexed on a shared channel comprising two branches and the transmission power for the transmitted data is set in response to the relative gain of the two branches. Hereby, the total system interference is reduced. The method and transmitter further allows for a cellular radio system individual power control loops for the two sub-channels when the system uses MUROS.

Hence, the output power emitted from the transmitter can be made to depend on the shape of the signal constellation for a single modulated carrier, where the shape of the signal constellation can be changed according to the value of a real-valued parameter. This parameter is denoted by the Greek letter $\alpha$. In order to differentiate the ordinary QPSK modulation from the new modulation introduced in the present invention, the term $\alpha$-QPSK will be used to denote the novel modulation. In addition the output power may also be controlled based on feedback from the mobile stations to which data is transmitted. Thus, the shape of the signal constellation as one variable is used to control the transmitted power. This is possible because the parameter determining the shape of the signal constellation determines not only the shape of the signal constellation but also the fraction of the total signal energy allocated to each of the sub-channels.

In accordance with one embodiment, the total energy of the $\alpha$-QPSK modulated signal is divided adaptively between the two branches.

In accordance with one embodiment, the energy distribution between the two branches of the $\alpha$-QPSK modulated signal can be changed from one transmission slot to the next transmission slot.

In accordance with one embodiment, the radio base station transmits data to two Global System for Mobile communication, (GSM), mobile stations sharing the same channel using the I and Q sub-channels of an $\alpha$-QPSK modulated signal.

In accordance with one embodiment, the relative gain of the two branches is determined based on measurements performed by the radio base station and/or on reports received from the mobile stations.

In accordance with one embodiment, the data is transmitted using an adaptive $\alpha$-QPSK modulation transmission scheme.

In accordance with one embodiment, $\alpha$ is set such that the power experienced by each of the mobile stations is equal to what they would require if they were alone in the timeslot.

In accordance with one embodiment, $\alpha$ is set such that the power experienced by each of the mobile stations is equal.

In accordance with one embodiment, the transmission power is determined by first determining a difference in transmission power to be used for the two mobile stations, then determining a based on the determined difference in transmission power, and finally determining the transmission power based on the determined α and a relative gain.

The invention also extends to a transmitter and a radio base station operating according to the above principles.

With a conventional power control method it is not possible to use individual power control loops for the two sub-channels. In accordance with the present invention it is possible to use an individual power control loop for each mobile station. Moreover, since one signal is intended for two mobile stations, it is possible to apply a formula that minimizes the power to be transmitted, thus reducing the total system interference. Finally, the invention provides compatibility with legacy GSM mobile terminals.

BRIEF DESCRIPTION OF THE DRAWINGS

The present invention will now be described in more detail by way of non-limiting examples and with reference to the accompanying drawings, in which.

DETAILED DESCRIPTION

Figure 1:
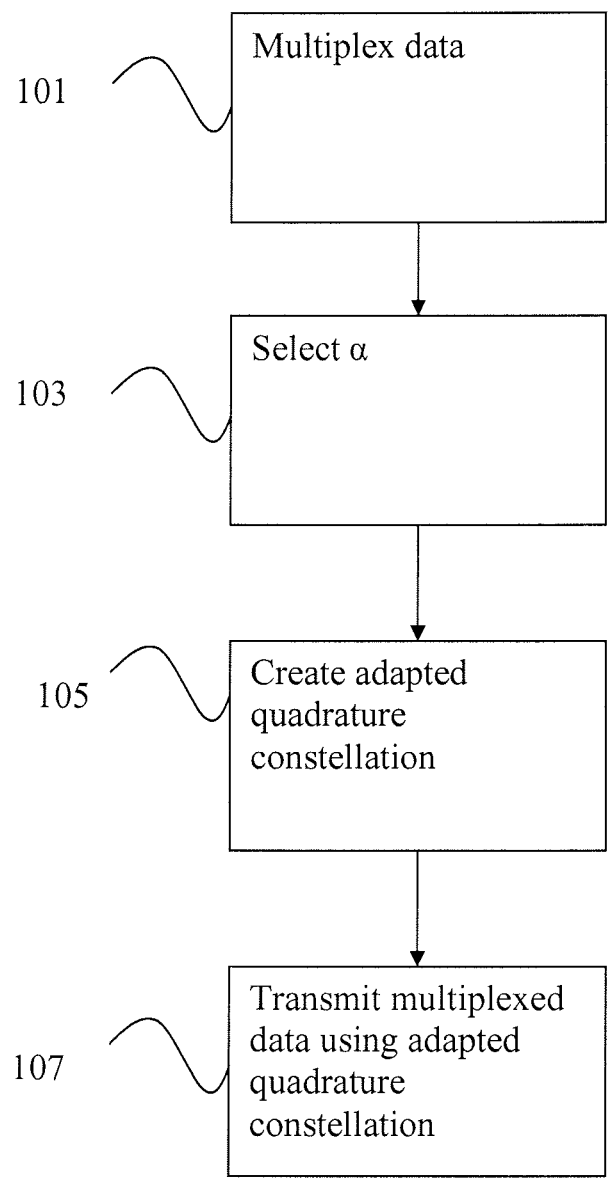
FIG. 1 is a flow chart illustrating different steps performed when modulating data.

In FIG. 1, a flowchart illustrating different steps performed when modeling data in accordance with one embodiment of the present invention is shown. First in a step 101 data to be transmitted to different users of a cellular radio system are multiplexed (parallel to serial conversion). A cross power ratio parameter $0 \leq \alpha \leq 1$, is then chosen based on for example, a predefined criterion or on feedback from one or many mobile stations in a step 103. A new quadrature constellation is then created as follows in a step 105:

$$\alpha\sqrt{\frac{1}{2}} + j\sqrt{2-\alpha^2}\sqrt{\frac{1}{2}}$$

$$\alpha\sqrt{\frac{1}{2}} - j\sqrt{2-\alpha^2}\sqrt{\frac{1}{2}}$$

$$-\alpha\sqrt{\frac{1}{2}} + j\sqrt{2-\alpha^2}\sqrt{\frac{1}{2}}$$

$$-\alpha\sqrt{\frac{1}{2}} - j\sqrt{2-\alpha^2}\sqrt{\frac{1}{2}}$$

Due to the symmetry between the real and imaginary parts, the parameter α may also be chosen in the interval $0 \leq \alpha \leq \sqrt{2}$. Values of α larger than one are obtained by first choosing $0 \leq \alpha \leq 1$ and then swapping the real and imaginary parts of the signal constellation. Each pair of bits (there are in total 4 possible combinations of two bits) is mapped uniquely to one of the 4 symbols in the new quadrature constellation.

In the following a quadrature constellation such as the one above will be referred to as adaptive α-QPSK constellation. Next in a step 107 multiplexed data are transmitted to the users using the modulation determined in step 105.

Figure 2:
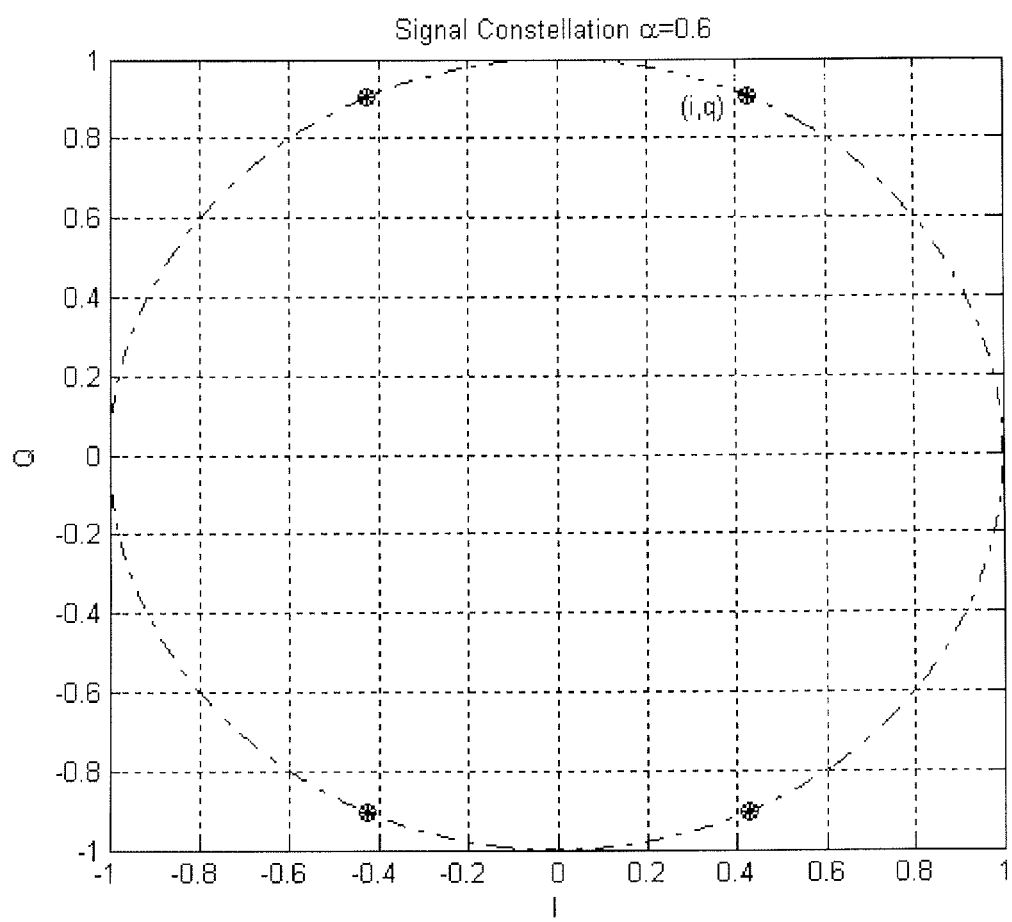
FIG. 2 is a view of an α-QPSK signal constellation.

In FIG. 2, the four points in an adaptive α-QPSK constellation are shown, with α=0.6.

In an adaptive α-QPSK constellation, the cross power ratio between the I and Q branches is $$\chi = \frac{\alpha^2}{2-\alpha^2} \quad (1)$$

Figure 3:
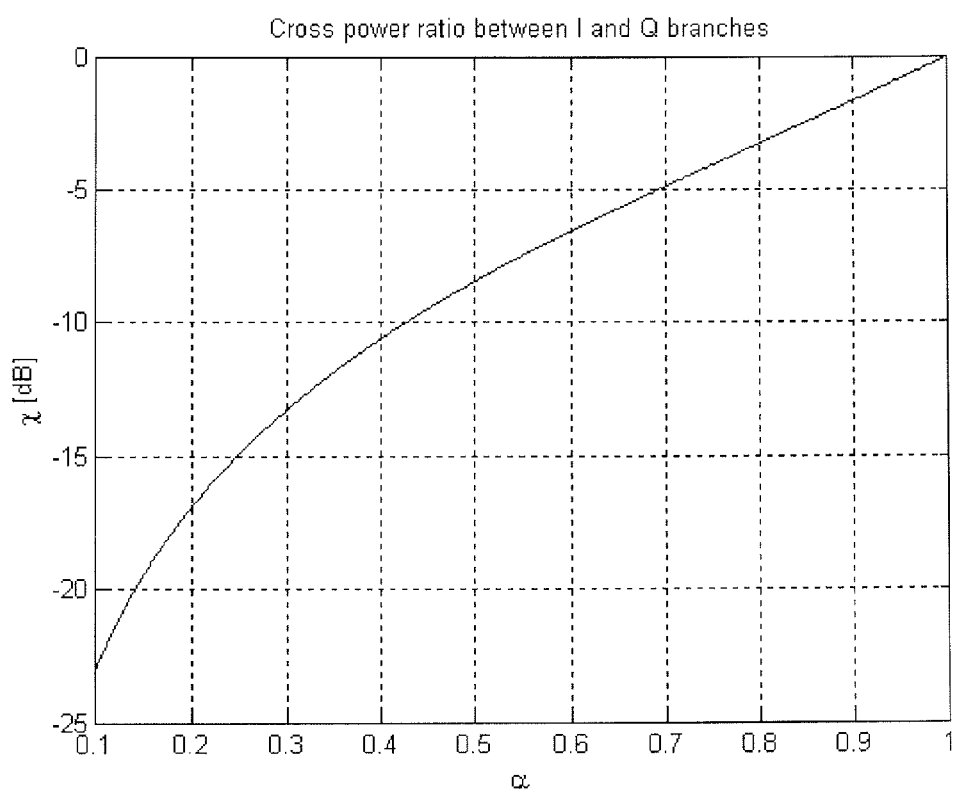
FIG. 3 is a view illustrating the cross power ratio between the I and Q branches.

In FIG. 3, the cross power ratio χ between the I and Q branches is shown as a function of α. For example, if α=0.6 then the power of the I branch is approximately 6.6 dB lower than the power of the Q branch. It is preferred to keep the total energy in the symbol constellation constant, independently of the value of α.

Figure 4:
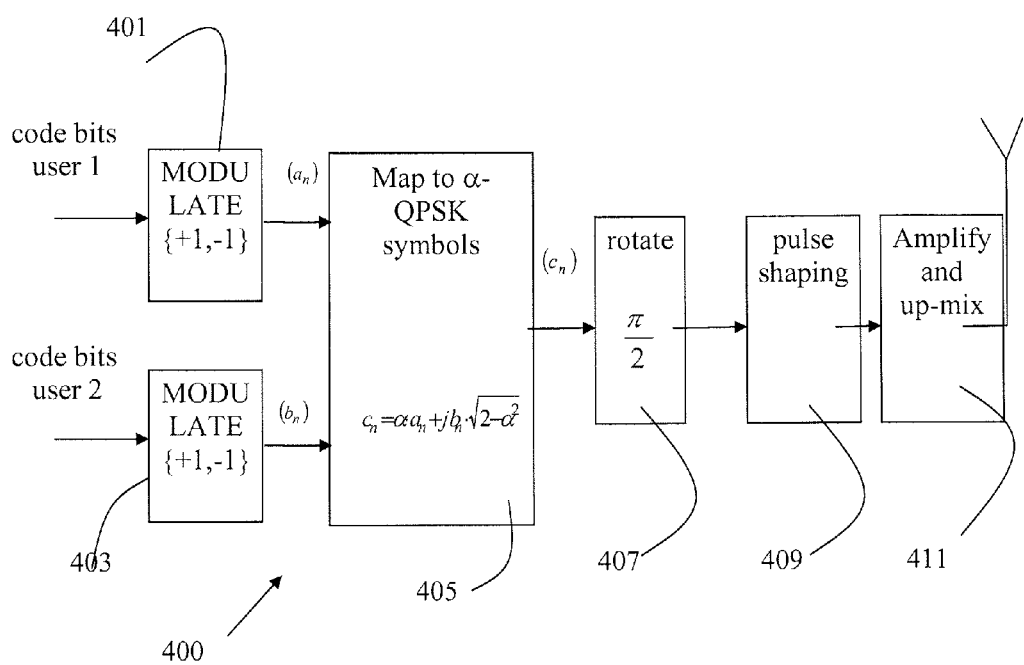
FIG. 4 is a view of a modulator.

In FIG. 4 an exemplary modulator 400 used in transmission of data in accordance with the above and using an adaptive α-QPSK modulation is depicted. The modulator 400 comprises initial modulators 401 and 403 for receiving and BPSK modulating data sequences to be transmitted to two different mobile stations. The modulators 401 and 403 are coupled to a mapping unit 405 adapted to map the BPSK signals from the modulators 401 and 403 in accordance with an adaptive α-QPSK constellation such as the one described hereinabove. The adaptive α-QPSK constellation sequence formed in the unit 405 is forwarded to a rotation block 407 connected to a pulse shaping filter 409 which in turn is connected to a unit 411 adapted to up-mix and amplify the signal to be transmitted to the intended receivers to the carrier frequency.

The modulator 400 may receive feedback from one or both mobile stations to which data is transmitted. In response to received feedback the modulator can be adapted to adjust α accordingly. For example a may be set to depend upon the distances from the two mobile stations to the Base Transceiver Station (BTS), the reported received signal quality (RXQUAL), or upon the capabilities of the mobile stations (e.g. legacy mobile terminal/α-QPSK aware mobile terminal.

Figure 5:
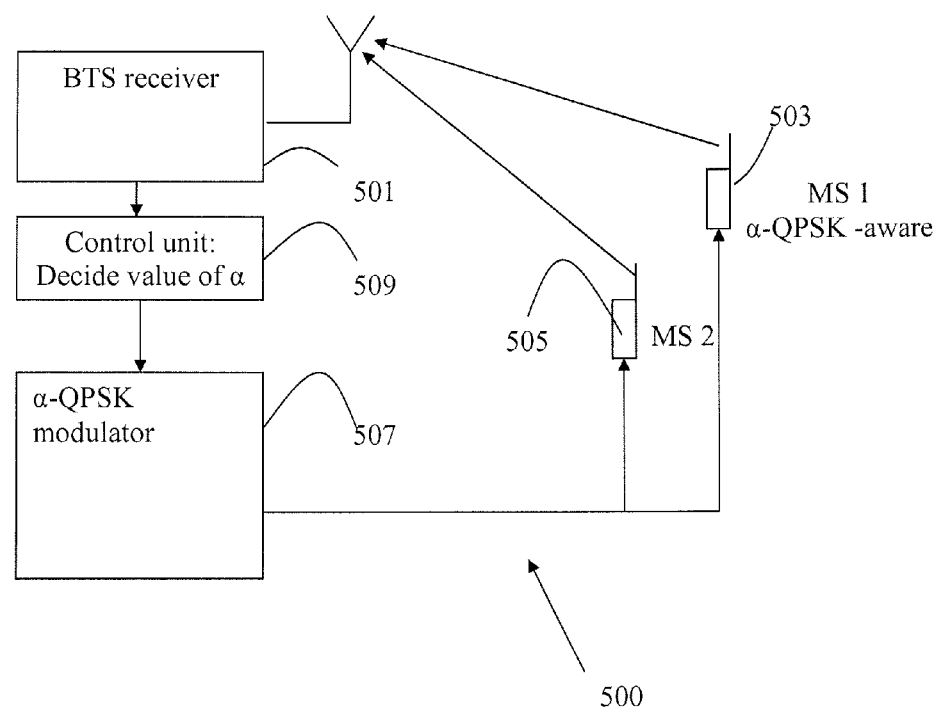
FIG. 5 is a view of a cellular radio system employing a transmission scheme in accordance with one exemplary embodiment.

In FIG. 5 an exemplary process of a cellular radio system 500 is illustrated. The system 500 comprises a BTS receiver 501 for receiving data transmitted from a number of mobile stations 503 and 505 connected to the cellular radio system via the Base Transceiver Station 501. The mobile stations 503 and 505 may be α-QPSK aware or non-α-QPSK aware. In the example depicted in FIG. 5, the mobile station 503 is α-QPSK aware whereas the mobile station 505 is non-α-QPSK aware. The system 500 further comprises a modulator 507, such as the modulator in accordance described above in conjunction with FIG. 4 for generating an adaptive α-QPSK modulated signal. In addition the system comprises a control unit 509 for calculating a suitable value α and for feeding the α-value to the α-QPSK modulator 507. The value of α may change from one transmission interval to a subsequent transmission interval. It is also possible to use a constant, predefined value of α.

Using adaptive α-QPSK modulation as described herein will improve the performance of a legacy receiver, while moderately punishing an α-QPSK-aware receiver.

When transmitting data to two users with signals mapped to the real and imaginary parts of the baseband signal using QPSK modulation, the modulator illustrated in FIG. 4 can be used.

Figure 6:
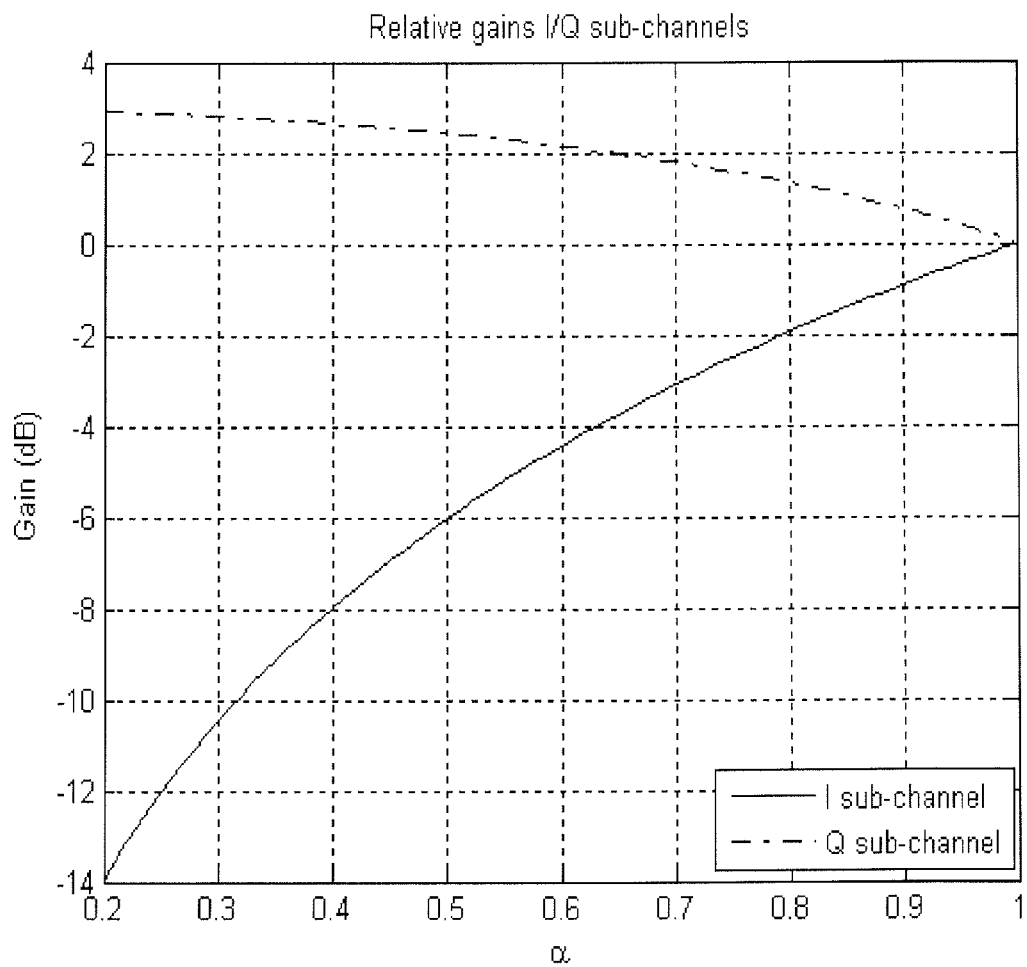
FIG. 6 is a view illustrating relative gains for adaptive α-QPSK modulation.

The parameter $0 \leq \alpha \leq \sqrt{2}$ is not fixed, but can be changed from burst to burst. The value $\alpha=1$ yields ordinary QPSK. In ordinary QPSK the signal energy is divided equally between the two sub-channels I and Q. The power in the I channel is changed by $10 \log_{10}(\alpha^2)$ dB, relative to the power of the I channel when using ordinary QPSK. Similarly, the power in the Q branch is changed by $10 \log_{10}(2-\alpha^2)$ dB, also relative to the power of the Q branch for ordinary QPSK. These relative gains are plotted in FIG. 6.

Thus, by changing $\alpha$ it is possible to divide the energy unequally between the sub-channels. In the extreme cases $\alpha=0$ and $\alpha=\sqrt{2}$ all signal energy is assigned to one of the sub-channels. The dependence between the powers of the sub-channels and $\alpha$ can be turned into an advantage for power control.

For example assume that two mobile stations are sharing the same frequency band and timeslot. In accordance with one embodiment of the present invention the power control module of the transmitter in the downlink channel is configured to choose an $\alpha$ such that the power experienced by each of the mobile stations is equal to what they would require if they were alone on the timeslot. In accordance to one embodiment the power control module of the transmitter in the downlink channel is configured to choose an $\alpha$ such that the power experienced by each of the mobile stations is equal for both mobile stations.

Figure 7:
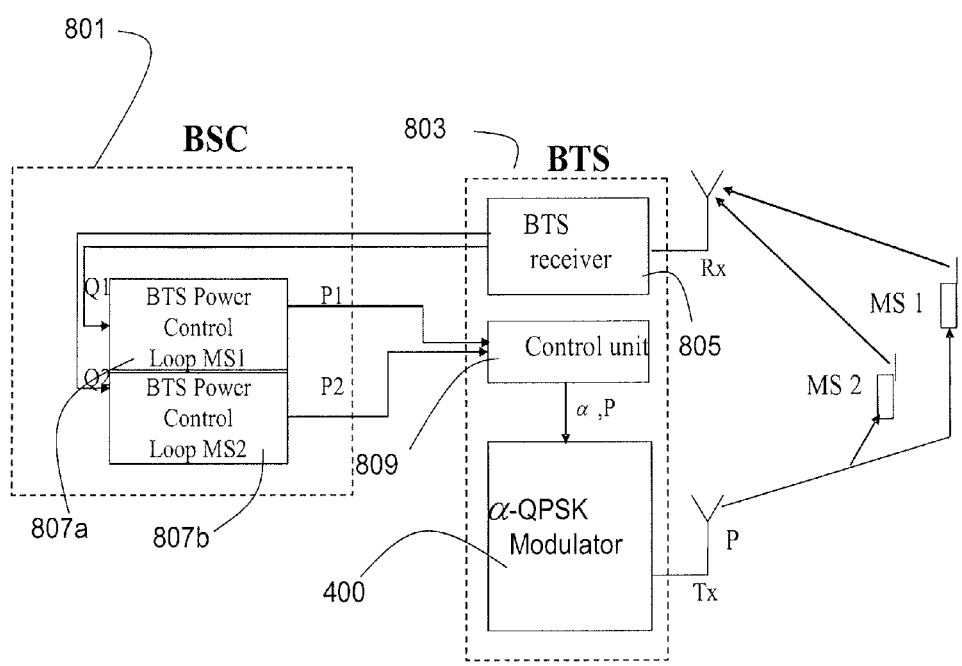
FIG. 7 is a view illustrating system for implementing a power control procedure.
Figure 8:
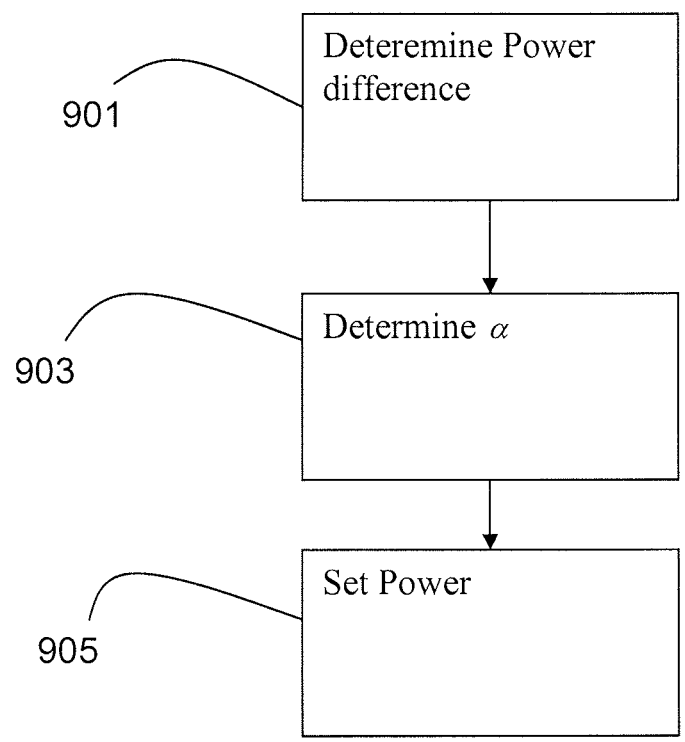
FIG. 8 is a flow chart illustrating steps performed when exercising power control.

A system for implementing a power control procedure in accordance with one embodiment of the present invention is illustrated in FIG. 7. The system depicted in FIG. 7 comprises a Base Station Controller (BSC) 801 that is connected to a BTS 803. Further, two mobile stations, here called MS1 and MS2, are connected to the BTS 803 and using MUROS on the downlink channel, and thus share the same timeslot. The BTS receiver 805 will receive the uplink signal strength from each of the mobile stations. Also, the BTS receiver 805 will calculate quality measures that describe the quality of the uplink. Examples of quality measures are besides signal strength, Bit Error Rate, (Bit Error Rate is quantified into RXQUAL values in GSM) or Frame Error Rate (FER). These quality measures and the signal strength are reported up to the BSC. In FIG. 8 the quality measures and the signal strength are reported up to the BSC 801 are called Q1 and Q2 in FIG. 8. Q1 and Q2 may be used as input to BTS Power Control Loops 807*a* and 807*b* for each of the mobile stations in the BSC. The output from the BTS Power Control is the power that the BTS should transmit on the downlink channel to MS1 and MS2, in FIG. 7 denoted P1 and P2. The power control signals transmitted to the BTS 803 can be sent back down to the BTS. However, with MUROS and a modulator 400 such as the one described above in conjunction with FIG. 4, both mobile stations are using the same channel and the Control Unit 809 in the BTS that uses P1 and P2 and may decide what $\alpha$ and output power P to use. The output power P and $\alpha$ can in accordance with one embodiment be uniquely determined from P1 and P2 in the follow way and with reference to FIG. 8.

First the parameter $\alpha$ is determined. The parameter $\alpha$ is directly related to the difference in power that should be allocated to each user. Thus, first in a step 901, a quantity Pdiff is determined as the difference in amplitude between P1 and P2. Next, in a step 903, the parameter $\alpha$ is determined. For example the parameter $\alpha$ can be read out from FIG. 6 as the value resulting in a gain difference between I- and Q-branch equal to Pdiff or the parameter $\alpha$ determined from a look up table.

To exemplify: Let P1=5 dB and P2=−1 dB=>Pdiff=6 dB. An $\alpha$ around 0.64 will result in a relative gain for the Q-branch of 2 dB, and a gain for the I-branch of −4 dB, hence a difference of 6 dB.

Thereupon in a step 905 the transmission power is set based on the relative gain in the two branches and the required. For any and all values of the parameter $\alpha$ the relative gain for the I- and Q-branch is given. Assume that P1 is assigned to the Q-branch and that the relative gain using $\alpha$ is PQ. Then the output power P is directly given by: P=P1−PQ⇔P=P2−PI.

To exemplify: Let P1=5 dB, P2=−1 dB. From FIG. 2 or a look up table $\alpha$=0.64, and the relative gains PQ=+2 dB and PI=−4 dB, for the Q-, I-branch respectively. The required output power P is the given by P=P1−PQ=5−2=3 dB, or P=P2−PI=−1−(−4)=3 dB.

In accordance with another embodiment the Control Unit 809 can be located in the BSC 801. In this case, the values $\alpha$ and P can be transmitted to the BTS 803 and the $\alpha$-QPSK Modulator 400.

Figure 9A:
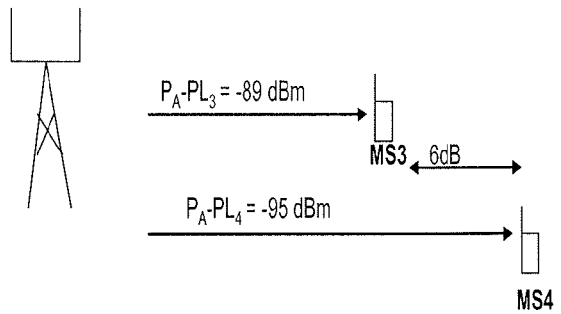
FIGS. 9a and 9b are views illustrating different power control mechanisms.

An advantage when using a power control in accordance with the present invention is that interference will be reduced. This is further illustrated with reference to FIGS. 9*a* and 9*b*. Here two different cases are described: In FIG. 9*a* the induced interference level without using the power control loop in accordance with the present invention is illustrated and in FIG. 9*b* the induced interference level when using the power control loop in accordance with the present invention is illustrated. In both FIGS. 9*a* and 9*b* mobile stations MS3 and MS4 are sharing the same frequency band and timeslot and, MS3 is allocated on the Q-branch, and the MS4 on the I-branch. Further, it can be assumed that a received signal strength is larger or equal to −95 dBm.

In the example depicted in FIG. 9*a*, a fixed $\alpha$=1 is used. The output power is adjusted such that the MS with largest pathloss ($PL_i$), here MS4, is satisfied. Here, MS3 is receiving a signal strength of −89 dBm and MS4 is receiving a signal strength of −95 dBm. To transmit data to these two mobile stations, the BTS transmits with the reference power of $P_A$.

Figure 9B:
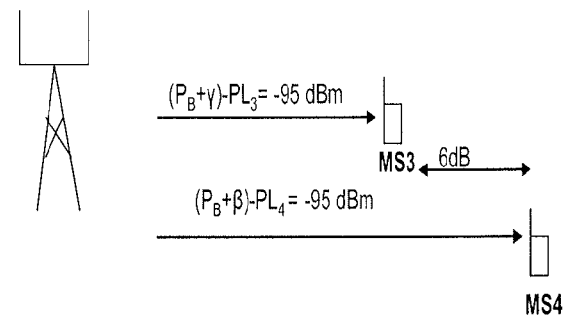

In the example depicted in FIG. 9*b*, $\alpha$-QPSK transmission is employed. Applying an $\alpha$=0.64 will allow for a reduced transmitted output power from the BTS; $P_B=P_A-2$ dB. Hence, both receiving mobile stations will experience a signal strength of −95 dBm, now with 2 dB less output power then in the transmission in accordance with FIG. 9*a*.

Using the method and transmitter as described hereinabove will result in that the need for an algorithm to re-locate mobile stations and pair mobile stations with similar radio conditions is reduced or even eliminated. Also, the total system interference is reduced. The method and transmitter further allows for a cellular radio system individual power control loops for the two sub-channels when the system uses MUROS.

The invention claimed is:

1. A method in a radio base station for transmitting data to two mobile stations in the same timeslot, the method comprising:
    modulating the data using an adaptive $\alpha$-QPSK symbol constellation;
    rotating a phase of the modulated data by $\pi/2$;
    transmitting the phase rotated modulated data to two mobile stations multiplexed on a shared channel comprising two branches, wherein the two branches correspond to the real and imaginary parts of one complex-valued baseband signal, wherein the two mobile stations comprise two Global System for Mobile communication (GSM) mobile stations; and
    setting a transmission power for the transmitted data in response to a relative gain of the two branches.

2. The method according to claim 1, further comprising adaptively dividing a total energy of the signal modulated between the two branches using the adaptive α-QPSK symbol constellation between the two branches.

3. The method according to claim 2, wherein an energy distribution between the two branches of the signal modulated using the adaptive α-QPSK symbol constellation is changeable from one transmission slot to the next transmission slot.

4. The method according to claim 1, further comprising determining the relative gain of the two branches based on at least one of:
measurements performed by the radio base station; and
reports received from the mobile stations.

5. The method according to claim 1 further comprising setting α such that the power experienced by each of the mobile stations is equal to what they would require if they were alone on the timeslot.

6. The method according to claim 1 further comprising setting α such that the power experienced by each of the mobile stations is equal.

7. The method according to claim 1 wherein setting the transmission power comprises:
determining a difference in the transmission power to be used for the two mobile stations;
determining α based on the determined difference in the transmission power; and
determining the transmission power based on the determined α and the relative gain.

8. The method of claim 1 wherein setting the transmission power comprises:
selecting α responsive to at least one of a predefined criteria and feedback from one or both of the mobile stations; and
setting the transmission power based on the selected α.

9. The method of claim 1 wherein setting the transmission power comprises:
selecting α in dependence on at least one of a mobile station class and a mobile station capability provided by the two mobile stations; and
setting the transmission power based on the selected α.

10. A radio base station, configured to transmit data to two mobile stations in the same frequency band and timeslot, the radio base station comprising:
a modulator configured to modulate data using an adaptive α-QPSK symbol constellation;
a rotator configured to rotate a phase of the modulated data by π/2;
a transmitter configured to:
transmit the phase rotated modulated data to two mobile stations multiplexed on a shared channel comprising two branches given by the real and imaginary parts of one complex-valued baseband signal, wherein the two mobile stations comprise two Global System for Mobile communication (GSM) mobile stations; and
set a transmission power for the transmitted data in response to a relative gain of the two branches.

11. The radio base station according to claim 10, further comprising a control unit configured to adaptively divide a total energy of the signal modulated using the adaptive α-QPSK symbol constellation between the two branches.

12. The radio base station according to claim 11, wherein the transmitter is configured to change an energy distribution between the two branches of the signal modulated using the α-QPSK symbol constellation from one transmission slot to the next transmission slot.

13. The radio base station according to claim 10, further comprising a control unit configured to set α such that a power experienced by each of the mobile stations is equal to what they would require if they were alone on the timeslot.

14. The radio base station according to claim 10, further comprising a control unit configured to set a such that a power experienced by each of the mobile stations is equal.

15. The radio base station according to claim 10, further comprising a control unit configured to:
determine a difference in the transmission power to be used for the two mobile stations;
determine α based on the determined difference in the transmission power; and
determine the transmission power based on the determined α and the relative gain.

16. The radio base station according to claim 10, wherein the transmitter is configured to determine the relative gain of the two branches based on at least one of:
measurements performed by the radio base station, and
reports received from the mobile stations.

17. The radio base station according to claim 10, wherein the modulator receives α from a base station controller, and wherein the α has been set such that a power experienced by each of the mobile stations is equal to what they would require if they were alone on the timeslot.

18. The radio base station according to claim 10, wherein the modulator receives α from a base station controller, and wherein α has been set such that a power experienced by each of the mobile stations is equal.

19. The radio base station of claim 10 wherein the transmitter sets the transmission power by:
selecting α responsive to at least one of a predefined criteria and feedback from one or both of the mobile stations; and
setting the transmission power based on the selected α.

20. The radio base station of claim 10 wherein the transmitter sets the transmission power by:
selecting α in dependence on at least one of a mobile station class and a mobile station capability provided by the two mobile stations; and
setting the transmission power based on the selected α.

* * * * *